Sept. 27, 1938.   L. C. BRISSON   2,131,369
BRAKING DEVICE
Filed Oct. 27, 1936   7 Sheets-Sheet 2
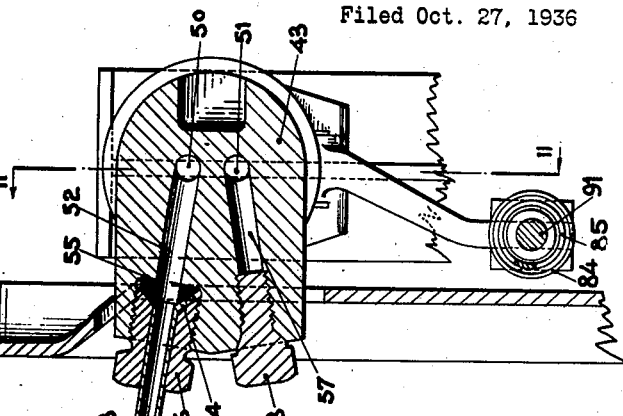
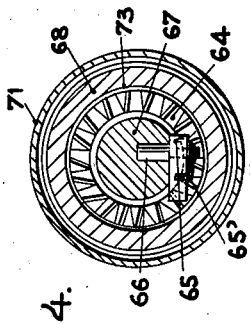
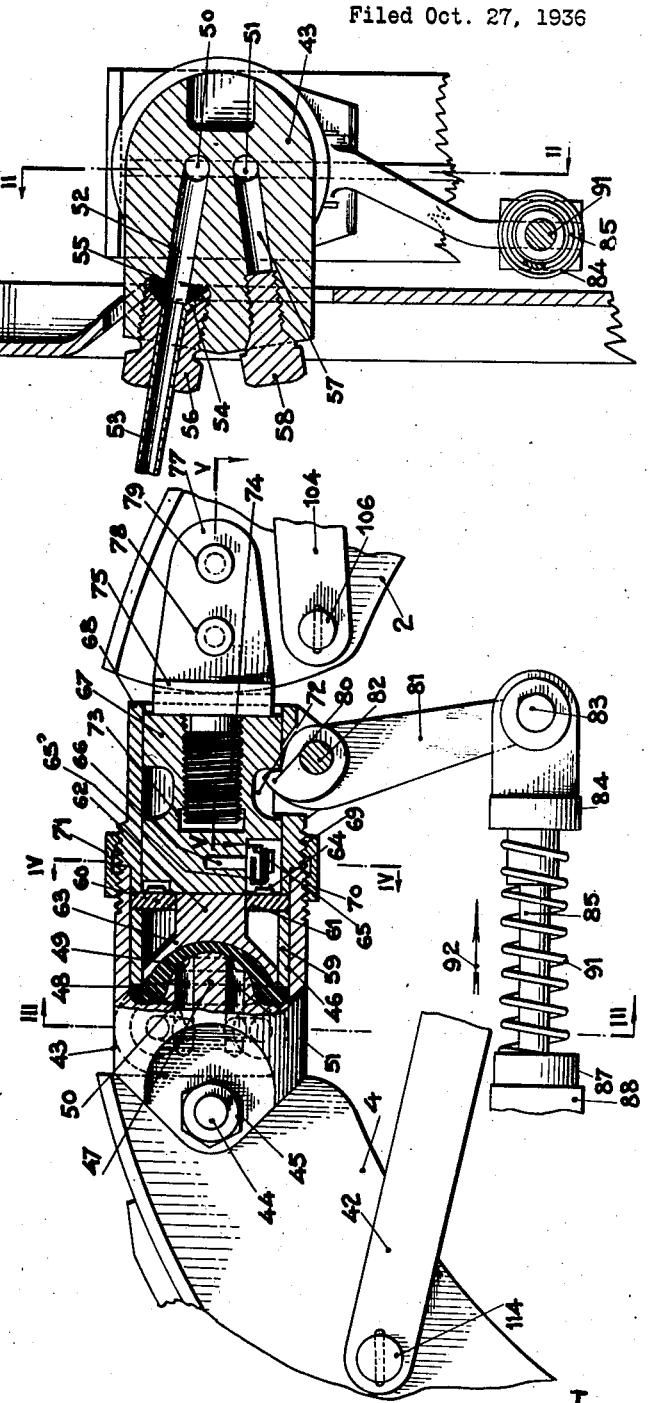
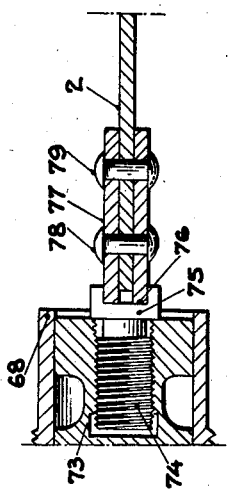
Inventor:
Louis Charles Brisson
By Haseltine, Lake & Co.
Attorneys.

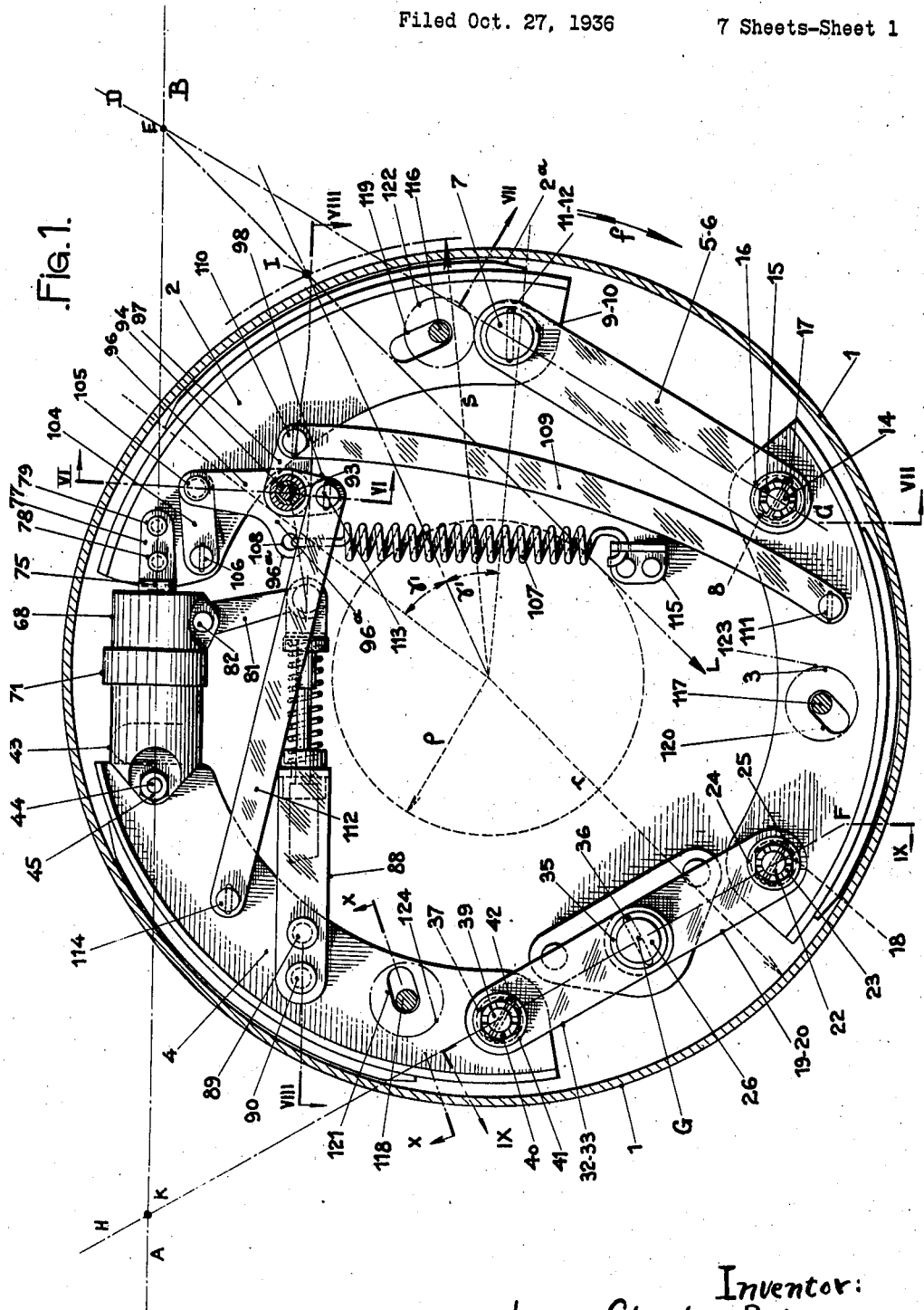

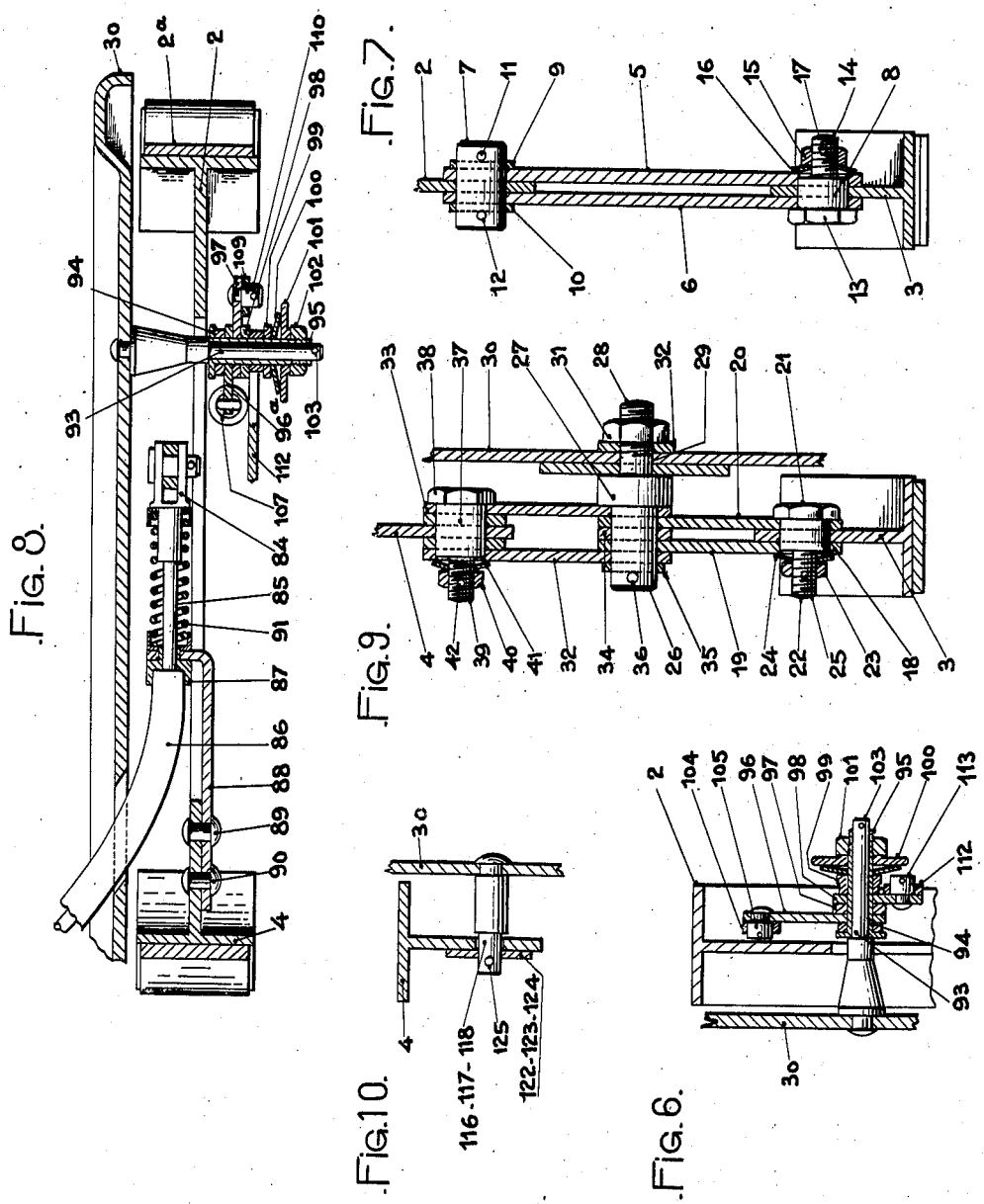

Sept. 27, 1938.                L. C. BRISSON                2,131,369
                                BRAKING DEVICE
                            Filed Oct. 27, 1936            7 Sheets-Sheet 4

Inventor:
Louis Charles Brisson
By Haseltine, Lake & Co.
    Attorneys.

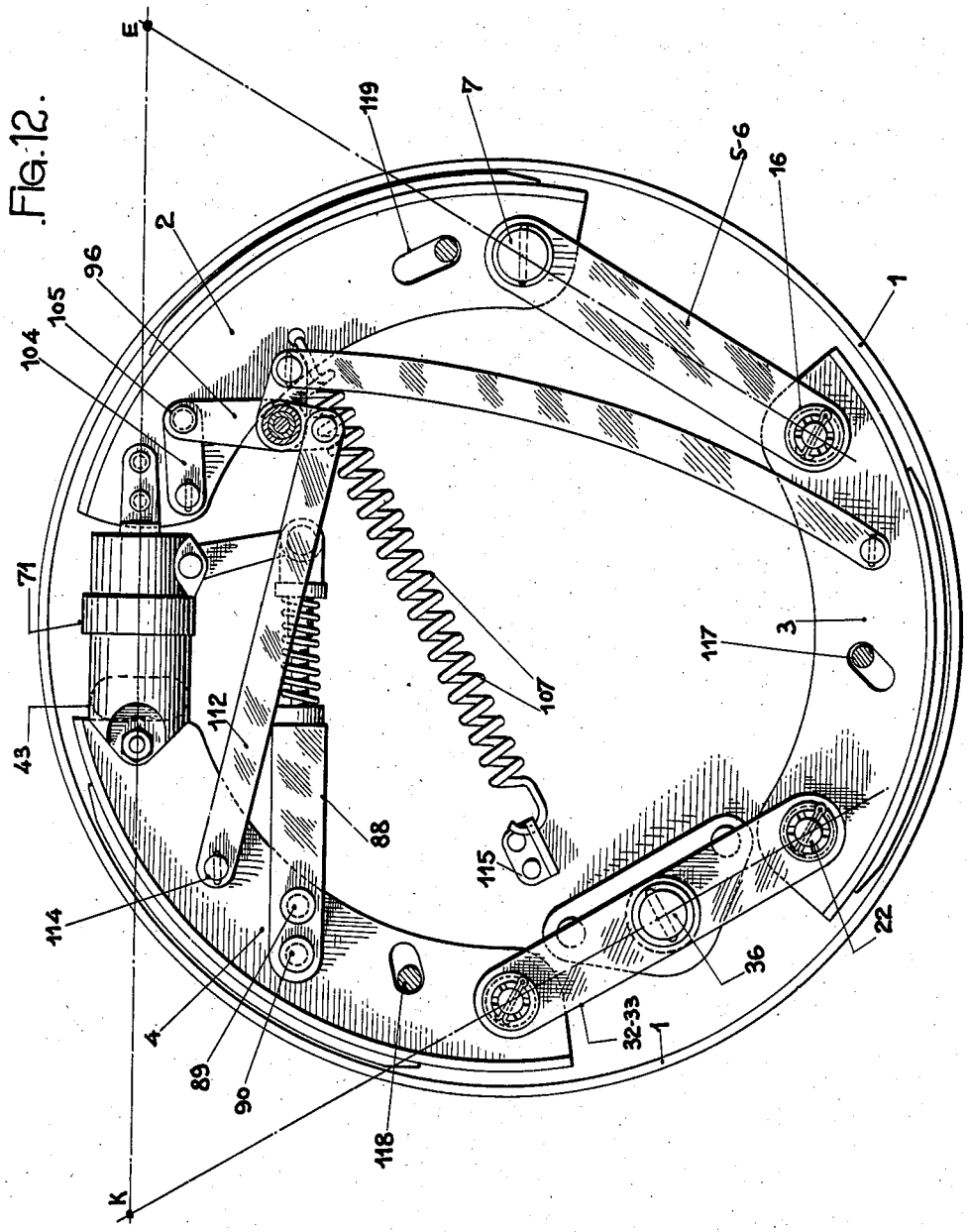

Sept. 27, 1938.  L. C. BRISSON  2,131,369
BRAKING DEVICE
Filed Oct. 27, 1936  7 Sheets-Sheet 6
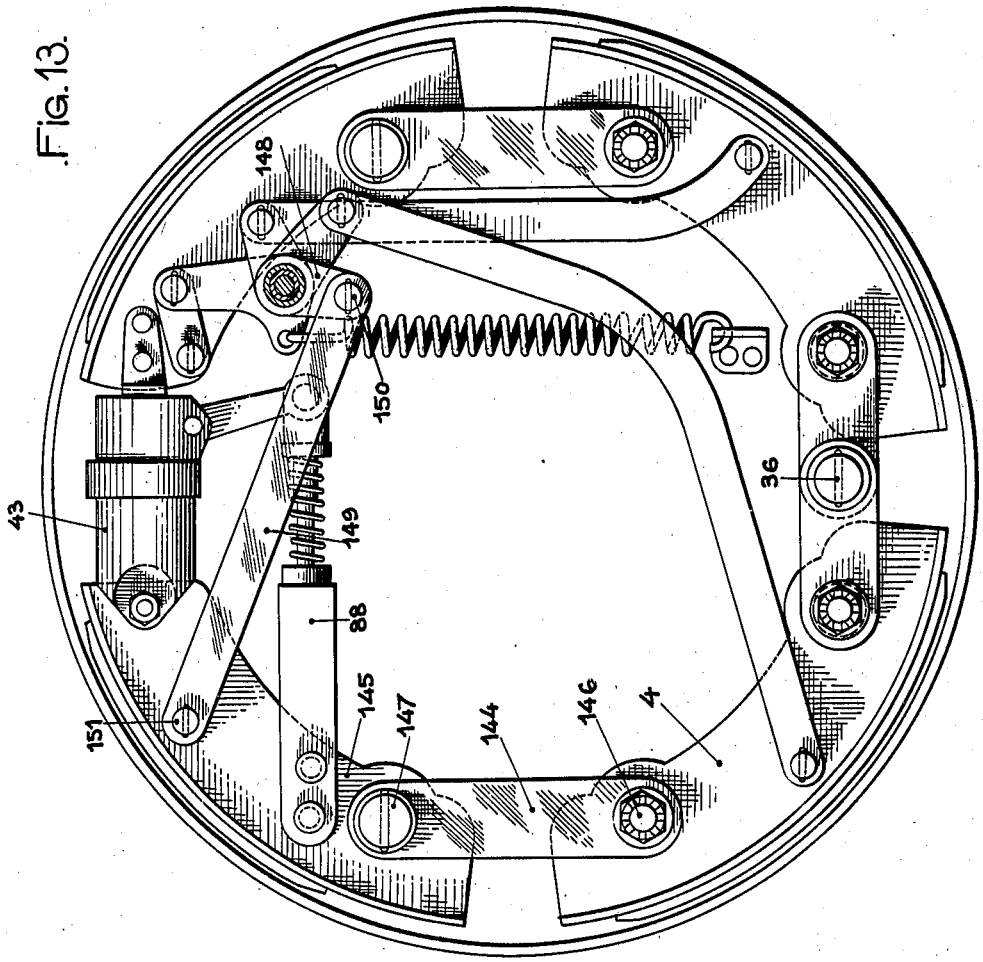
Inventor:
Louis Charles Brisson
By Haseltine, Lake & Co.
Attorneys.

Sept. 27, 1938.  L. C. BRISSON  2,131,369
BRAKING DEVICE
Filed Oct. 27, 1936  7 Sheets-Sheet 7
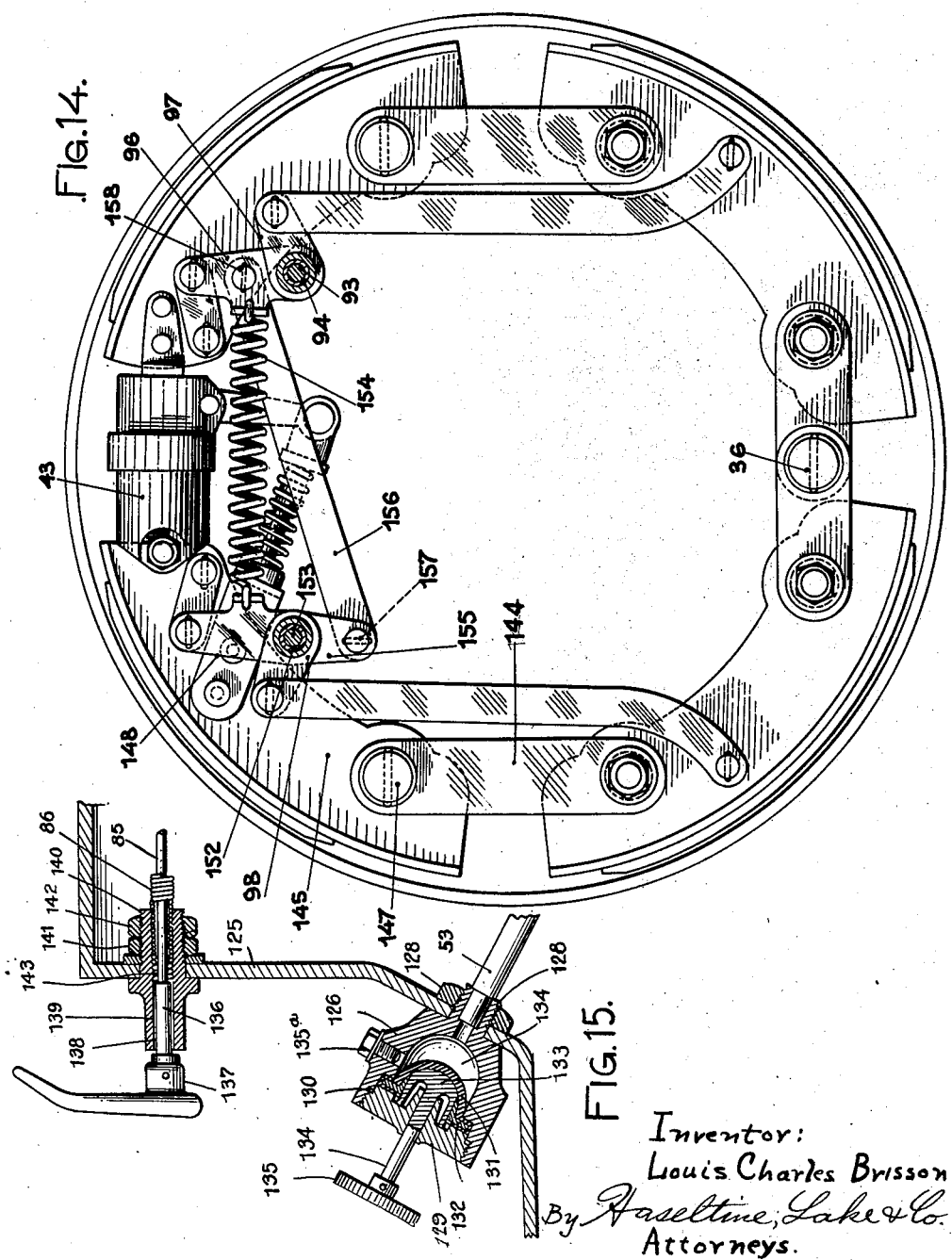
Inventor:
Louis Charles Brisson
By Haseltine, Lake & Co.
Attorneys.

Patented Sept. 27, 1938

2,131,369

UNITED STATES PATENT OFFICE 2,131,369

BRAKING DEVICE

Louis Charles Brisson, Neuilly-sur-Seine, France, assignor to Societe Anonyme: Société des Freins Hydrauliques S. de Lavaud, Paris, France Application October 27, 1936, Serial No. 107,781
In France September 30, 1936

15 Claims. (Cl. 188—78)

This invention relates to braking devices applicable to all varieties of machinery involving rotating elements, namely to such devices commonly used on vehicles of all kinds, for example on automotive vehicles; and it relates more particularly, although not exclusively, to drum-type brakes comprising friction shoes, in which the forces and reactions acting on said friction shoes have definite and fixed directions and converge at one point for each of said shoes, which point is called the "pole" of the shoe.

In this type of brake, difficulty has been found heretofore in returning the brake shoes, at the end of the braking period, to definite and fixed "off" positions, or positions of rest.

The main purpose of my invention is to provide a simple, practical, reliable and not costly solution of this problem.

The principal object of my invention is to provide a braking device applicable to all varieties of machinery involving rotating elements, in which the brake shoes, during the idle or "off" periods, are automatically returned to definite and fixed positions of rest.

In certain brakes of the type hereinbefore described, use is made of hydraulic means for expanding the brake shoes and applying them against the brake drum. It has further been proposed, in my co-pending application Ser. No. 63,458, filed on Feb. 11, 1936, to attach said hydraulic expanding means to one of the brake shoes; furthermore, U. S. Patent No. 1,998,533 discloses the combination in such brakes of hydraulic expanding means with mechanical expanding means.

Another object of my invention is to provide a braking device of the type described which is equipped with combined hydraulic and mechanical operating means, the body of said combined mechanism being mounted on one of the brake shoes.

A further object is to provide a braking device of the type described, embodying the automatic self-applying feature.

A still further object is to provide a braking device of the type described, incorporating, in combination with the various features hereinbefore defined, means for automatically adjusting the slack, in order to compensate for the wear in the brake packing, said slack adjusting means being operative both in case of hydraulic and of mechanical operation of the brake.

Further objects and advantages of my invention will appear to one skilled in the art from the following description, with reference to the accompanying drawings; but it is to be understood that said description and drawings are presented merely by way of illustration, and that they should not be construed in any fashion as limiting the appended claims short of the true and most comprehensive scope of the invention in the art.

In the drawings:

Fig. 1 is a view in elevation of one of the preferred embodiments of my invention;

Fig. 2 is a large-scale view in cross-sectional elevation through line II—II of Fig. 3, of certain details of Fig. 1;

Fig. 3 is a view in cross-sectional side elevation through line III—III of Fig. 2, of the details shown in Fig. 2;

Fig. 4 is a view, in cross-sectional side elevation, of the same details, but through line IV—IV of Fig. 2;

Fig. 5 is a view in plane cross-section through line V—V of Fig. 2, of one of the details illustrated in that figure;

Fig. 6 is a view in cross-section through line VI—VI of Fig. 1;

Fig. 7 is a view in cross-section through line VII—VII of Fig. 1;

Fig. 8 is a view in cross-section through line VIII—VIII of Fig. 1;

Fig. 9 is a view in cross-section through line IX—IX of Fig. 1;

Fig. 10 is a view in cross-section through line X—X of Fig. 1;

Fig. 12 is a view in elevation similar to that of Fig. 1, but referring to a variant of my invention;

Fig. 13 is a view in elevation similar to that of Fig. 1, but referring to a second preferred embodiment of my invention;

Fig. 14 is a similar view, but referring to a third embodiment;

Fig. 15 is a detail view of one of the preferred forms of the brake operating mechanism.

Figure 11:
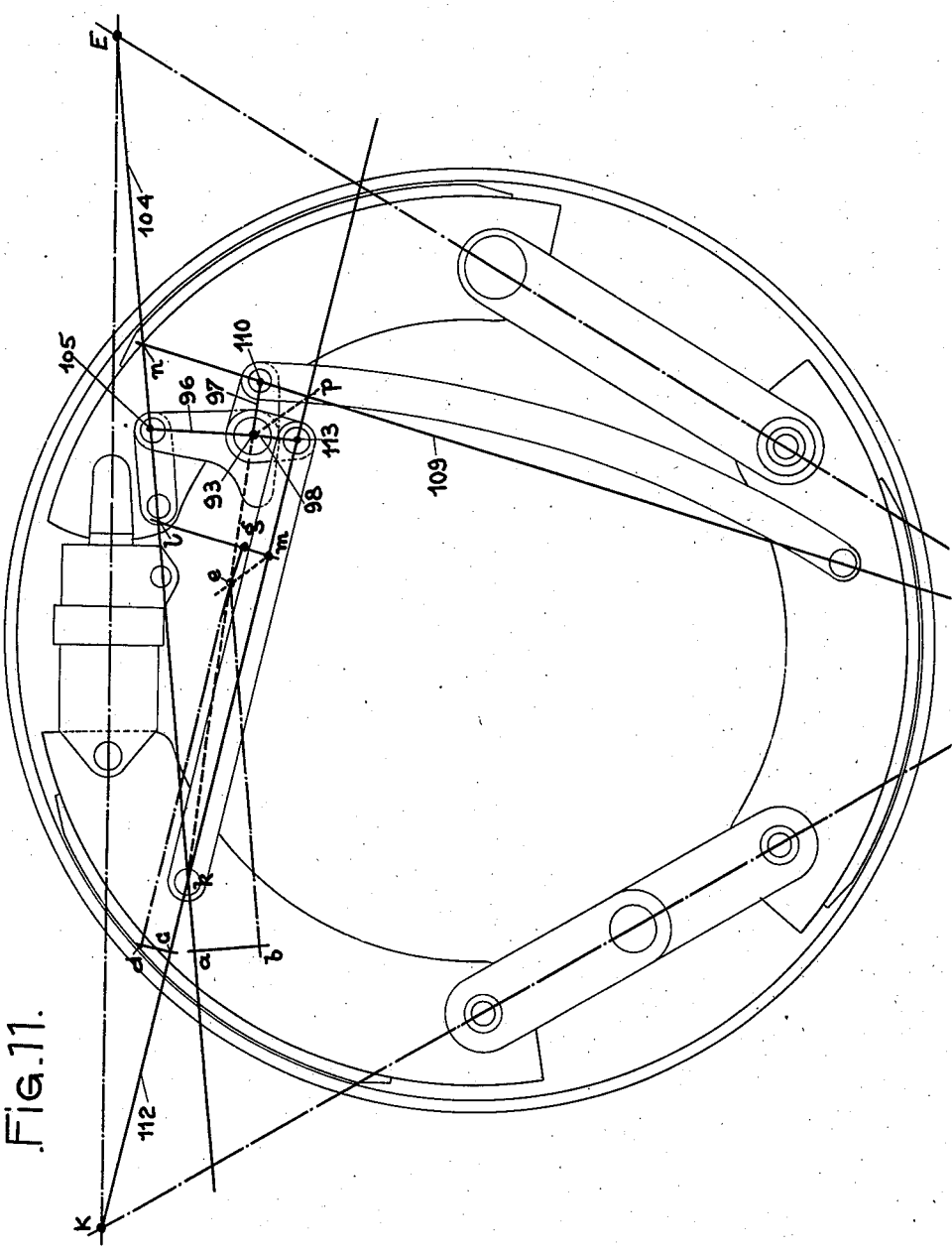
Fig. 11 is a geometric diagram explaining the method to be followed in laying out the brake parts.

In the preferred embodiment of my invention illustrated in Fig. 1, 1 is the brake drum, and the friction members, or brake shoes, intended to be applied against the inner face of said drum, are shown at 2, 3 and 4. The drum 1 is rigidly fixed to the rotating machine part to be braked, as for example to the wheel of an automotive vehicle; but it is to be understood that my invention is in no way limited in its use to this particular application. The normal direction of rotation of the drum 1 is indicated, in Fig. 1, by the arrow *f*; hence, in the case of an automotive vehicle, said arrow *f* indicates the direction of rotation of the drum corresponding to forward motion of the vehicle.

The brake shoe 2 is interconnected with brake shoe 3 by link members 5 and 6, which are articulated by means of a pin 7 onto the brake shoe 2, and by means of a pin 8 onto the brake shoe 3. The articulated joint on pin 7 is free, meaning thereby that no special precaution is taken to provide substantial frictional resistance between said pin and said articulated members; the pin 7 is simply held in place by means of washers 9 and 10 and cotter pins 11 and 12.

On the contrary, the articulated joint on the pin 8 is designed to provide a relatively large frictional resistance tending to oppose the relative rotation of the link members 5 and 6 with respect to the brake shoe 3. For this purpose, the pin 8 is provided on one end with a head 13, and on the other end with a threaded portion 14, upon which is screwed a nut 15 coacting with a spring washer 16. In this manner, the members articulated on the pin 8 are subjected to an elastic pressure that may be adjusted at will by tightening or loosening the nut 15, said elastic pressure producing between the link members 5 and 6 and the brake shoe 3 the frictional resistance required. The nut 15 may be notched and held in position by means of a cotter pin 17, or by any other suitable means.

At its other end, the brake shoe 3 is provided with another pin 18, upon which are articulated two other link members 19 and 20. The articulation at 18 is also a friction joint, and to this end the pin 18 is provided at one end with a head 21, and at the other end with a threaded portion 22 upon which is screwed a nut 23 coacting with a spring washer 24 to exert a suitable elastic pressure on the articulated members, said nut 23, when screwed to the position producing the correct frictional resistance, being maintained in said position by means of a cotter-pin 25. The link members 19 and 20 are freely articulated on a fixed pivot pin 26 (Figs. 1 and 9). Said pivot pin 26 is provided with a base or collar 27 formed integrally thereon and with a threaded portion 28 which engages in a hole 29 drilled in the fixed cheek member of the brake 30. A nut 31 screwed onto said threaded portion, with a washer 32, enable said pin 26 to be rigidly secured to said fixed cheek member 30.

Two other link members 32 and 33 are further articulated onto the pin 26, preferably on opposite sides of link members 19 and 20, the latter being preferably separated from each other by means of a washer 34. The complete articulated joint on the pin 26 rests upon the base 27, and is maintained in position by means of a cotter pin 36. Said articulated members are therefore free to rotate without substantial frictional resistance.

The link members 32 and 33 are articulated with friction onto the brake shoe 4 by means of a pin 37 provided with a head 38 and threaded portion 39, upon which is screwed a nut 40 which presses upon said articulated members through the medium of an elastic washer 41. When the nut 40 is tightened to give the correct frictional resistance between the articulated members, it is locked in position by means of a cotter pin 42.

The brake shoe 4 carries, at its other end, the body or cylinder 43 of the device for expanding the brake shoes. Said body 43 is rigidly secured to said brake shoe 4 by means of a bolt 44 and nut 45. Said body 43 is provided internally with a cylindrical bore 46, the end of which forms a convex surface 47 which may optionally be spherical, said convex surface being covered by a thick cup-shaped membrane of rubber, 48. Said projecting convex portion 47 is provided with an annular groove 49 in which groove 49 terminate two ducts 50 and 51. Said duct 50 connects with another duct 52 supplied with a fluid under pressure by means of a feed pipe 53, said feed pipe being connected by suitable tight jointing means with the cylinder 43. For this purpose, the feed pipe 53 is provided with a conical outlet 54 within which fits a conical washer 55, the joint being made tight by the pressure of a screw collar 56. On the other hand, the duct 51 communicates with another duct 57, the latter being closed by means of a blind screw plug 58.

The edges of the cup-shaped rubber diaphragm or membrane 48 is firmly clamped by means of a cylindrical sleeve 59, which is pressed down upon the edges of said membrane by means which will be described later. On the other end of said sleeve 59 is applied a flat disk 60 provided at its center with an orifice 61 through which passes the rod 62 of a piston-like member 63, said piston member 63 being applied against the membrane 48. The disk 60 is provided on its outer face with a crown of ratchet teeth 64, which teeth co-act with a pawl 65 pivoted at 66 on a secondary piston member 67. Said pawl 65 is subjected to the action of a spring 65' which tends to maintain it in continual engagement with said ratchet teeth 64. Said secondary piston member 67 slides axially within a cylinder 68 which is pressed against the disk 60. To this end, the cylinder 68 is provided on its outer edge with a threaded portion 69, while the cylinder 43 comprises on its outer edge, facing that of cylinder 68, a similar threaded portion 70, but of opposite pitch to that of 69. A threaded collar 71 provided with opposite screwthreads corresponding with those on cylinders 43 and 68, engages simultaneously said screwthreads 69 and 70, thus clamping the cylinder 68 against the disk 60, said pressure being transmitted by the sleeve 59 to the periphery of the rubber membrane 48.

The secondary piston member 67 is provided with a deep lateral groove 72 and an axially bored hole 73, which hole is tapped so as to form a nut on a screw member 74 terminated by a head 75. Said head 75 comprises a slot 76 within which fits tightly an abutment member 77 secured by means of rivets 78 and 79 to the brake shoe 2. In this manner, the screw 74 is prevented from rotating.

A finger 80 formed integrally on a lever 81 pivoted by means of a pin 82 onto the cylinder 68 engages the lateral groove 72. On its other end, the lever 81 is articulated by means of a pin 83 to a knuckle joint 84 to which is attached a flexible control cable 85, said flexible cable being axially slidable within a flexible guiding sheath 86 (Figs. 2 and 8), the end of which sheath is anchored to a supporting bracket 88 riveted at 89 and 90 to the brake shoe 4. A helical spring 91 is inserted between said bracket 88 and said knuckle 84, in such manner as to push said knuckle in the direction of the arrow 92.

On a pivot pin 93 (Figs. 1 and 8), rigidly mounted on the fixed cheek member 30 of the brake, is rotatably mounted a sleeve member 75

94 threaded at its outer end 95. On said sleeve member 94 are mounted in succession three operating levers 96, 97 and 98, a rigid washer 99, an elastic washer 100 and finally another rigid washer 101, the assembly of the three levers and three washers being pressed together by means of a nut 102 screwed onto the screwthread 95 of the sleeve 94, in such manner as to create a material frictional resistance between said operating levers 96, 97 and 98 and said sleeve 94. The latter is maintained in its position on the pin 93 by a cotter pin 103.

A link member 104 is articulated by means of a pin 105 onto the other end of lever 96, and by a pin 106 onto the brake shoe 2. Furthermore, a helical spring 107 attached to a support 115, rigidly secured to the cheek member 30 of the brake, engages at 108 a second arm 96a of the lever 96. A link member 109 is articulated by means of a pin 110 onto the lever 97, and by means of a pin 111 to the brake shoe 3. Finally, a link member 112 is articulated by means of a pin 113 onto the lever 98, and by means of a pin 114 onto the brake shoe 4.

Pins 116, 117 and 118, which are rigidly secured to the fixed cheek member 30 of the brake, pass freely, with ample clearance, respectively through slotted orifices 119, 120 and 121 formed in the brake shoes 2, 3 and 4; and said pins bear on their outer ends guiding washers 122, 123 and 124, held in position by cotter pins such as 125 (Fig. 10).

The bottom of the slot 76 cut in the head 75 of the screw member 74 is a plane surface perpendicular to the center line of said screw 74. The result is, of course, that the contact pressure between the head 75 and the abutment member 77 terminating the brake shoe 2 is directed along a geometric straight line AB which coincides with the center line of the screw 74. The forces transmitted by the link members 5 and 6 between the brake shoes 2 and 3 are evidently directed along the center lines of said link members, that is along the straight line CD passing through the centers of the pins 7 and 8. The straight lines AB and CD intersect at a point E, and the pins 105 and 106 are so located that the straight line passing through the geometric centers of said pins also passes through point E, which is known as the "pole" of the brake shoe 2.

The forces transmitted by the link members 5 and 6 to the brake shoe 3 are directed along the straight line CD, and the reaction transmitted by the link members 19 and 20 to the same brake shoe 3 are directed along the line GF, which passes through the geometric centers of the pins 36 and 18. The straight lines CD and GF intersect at a point not shown on the figures, which point is the pole of the brake shoe 3. The pins 110 and 111 are so located that the straight line passing through their geometric centers also passes through said pole.

Finally, the reactions transmitted to the brake shoe 4 by the link members 32 and 33 are directed along the straight line GH which passes through the geometric centers of the pins 26 and 37. The line GH intersects the line AB at a point K, which is the pole of the brake shoe 4. The pins 113 and 114 are so located that the straight line which passes through their geometric centers also passes through the pole K.

In the foregoing discussion, I have considered all the forces and reactions to which are separately subjected each of the brake shoes 2, 3 and 4, with the exception of the reaction exerted by the revolving brake drum 1 upon the shoes applied against its surface. I have shown that all the forces acting on each brake shoe converge at one point, which point is the pole of that brake shoe. Therefore the condition of equilibrium of the brake shoe during the braking period necessarily requires that the reaction of the brake drum upon said brake shoe should also pass through the pole.

The problem of the determination of the direction of said reaction of the brake drum has been completely treated in the German Patent No. 603,850. It has been demonstrated in said German patent that the reaction is tangent to a circle having the same center O as the brake drum 1, and whose radius $\rho$ is given by the formula:

$$\rho = s \sin \varphi \qquad (1)$$

In Formula (1)—  $\varphi$ is the angle of friction
$s$ is the radius of the "pressure circle," the value of which is computed by the formula:

$$\frac{s}{r} = \frac{4 \sin \gamma_1}{\sin 2\gamma_1 + 2\gamma_1} \qquad (2)$$

In Formula (2)— $r$ is the radius of the brake drum 1;
$2\gamma_1$ represents the angular opening of the brake packing $2a$ on the brake shoe 2.

It is therefore possible to lay out the reaction EL, which intersects the pressure circle at a point I called "center of pressure." In accordance with the teachings of German Patent No. 603,850, the brake packing $2a$, for example, is arranged symmetrically with respect to the axis of pressure OI. Said axis of pressure is that which corresponds to forward motion of the vehicle, that is to rotation of the drum in the direction of the arrow $f$. Of course, on all the other brake shoes, the packings are also set symmetrically with respect to the axis of pressure of each brake shoe for forward motion. This insures the advantages mentioned in the German Patent No. 603,850, to wit: Uniformity of wear of the brake packing, great improvement in the constancy of the braking effect in spite of variations in the coefficient of friction between the brake packing and the drum, a much more gradual progression in the braking effect, and the elimination of the tendency to sudden blocking of the wheels.

It will be explained further that the relative positions of the links 104, 109 and 112 with respect to the corresponding levers 96, 97 and 98, and the relative positions of pins 106, 111 and 114 on one hand, and of the pin 93 on the other hand, are by no means indifferent, and should be accurately determined; and finally that the lengths of levers 96, 97 and 98 must be correctly laid out. Although these explanations properly form a part of the description of the brake mechanism, they can only be easily understood after the description of its operation; for that reason, they will be deferred until later.

The operation of the brake is as follows:

When the driver wishes to apply said brake, he may either produce a hydraulic pressure inside the feed pipe 53 by any suitable means, or else exert a pull on the flexible cable 85.

Fig. 15 shows one of the preferred forms of said brake applying means. In that figure, 125 represents a fixed frame upon which is mounted a body 26, said body being provided, for mounting purposes, with a screw-threaded portion 127 passing through said frame, and a nut 128 engaging said threaded portion. The body 126 is hollow and is closed by a screw cap 129 which co-operates with a tapped portion 130 of said body 126. When screwed down into place, the screw cap 129 firmly clamps the edges of a heavy cup-shaped rubber membrane or diaphragm 131, which may, for example, be of spherical shape. Said rubber diaphragm is made perfectly tight by means of a peripheral metallic sealing ring 132, which also serves as a guide for a piston member 133, the piston rod of which 134, terminating in a pedal 135, passes through the screw cap 129. The space 134 inside said body 126 communicates with the feed pipe 53; a filling hole closed by a screw plug is shown at 135. It will be readily seen that, once the feed pipe 53 and the entire space 134 have been filled with liquid, a hydraulic pressure will be created therein by pressing upon the pedal 135, which hydraulic pressure will be transmitted to the expanding mechanism contained in the body 43.

On the other hand, the mechanical operating mechanism is as follows: The cable 85, one end of which is attached to the lever 81, is attached at the other end to a guiding rod 136, to which is secured a handle 137. Said rod 136 slides within a bore 138 drilled in a support 139 secured to the frame 125 by means of a threaded portion 140, a nut 141 engaging said threaded portion and a lock nut 142. Furthermore, the support 139 is tapped at 143 to accommodate the threaded ring terminating the sheath 86 guiding the flexible cable 85. It will readily be seen that a pull exerted on the handle 137 will be transmitted by the cable 85 to the brake operating lever 81, thus operating the brake expanding mechanism.

The operation of the hydraulic brake-expanding mechanism will now be described.

The hydraulic pressure produced by pressure on the pedal 135 swells out the cup-shaped rubber membrane or diaphragm 48, which in turn displaces towards the right the piston member 63 and its rod 62. Said rod 62, which contacts with the secondary piston 67, transmits its motion to said secondary piston, which in turn transmits its motion to the brake shoe 2, through the medium of the screw 74, whose threads have a very low pitch. The force exerted by the hydraulic pressure therefore tends to move the brake shoe 2 towards the right, and the brake shoe 4 towards the left, since the body 43 of the expanding mechanism is secured to said brake shoe 4.

The force applied to the brake shoe 4 tends to make the latter rotate around the pin 26 as a center; for, as explained above, the brake shoe 4 is articulated with friction to the link members 32 and 33, while said link members are freely articulated onto the pin 26. It is clear, therefore, that the assembly of the brake shoe 4 and the link members 32 and 33 rotates as a whole around the pin 26. In the course of this movement, the pin 114 moves with the brake shoe 4 and entrains, by means of the link member 112, the lever 98. It will be recalled that the lever 98 is coupled by frictional resistance to the levers 96 and 97, and also to the sleeve 94. Therefore the levers 96, 97 and 98 tend to revolve together, the more readily that the effort exerted on the brake shoe 2 causes said brake shoe to move to the right, which motion is transmitted to the lever 96 by the pin 106, the link member 104 and the pin 105. It will be understood therefore that the expanding motion of the brake shoes, at least at the start of said motion, causes the three levers 96, 97 and 98 to rotate as one integral unit. It should of course be noted that the friction between said levers is sufficient to overcome the resistance of the spring 107.

The brake shoe 3 is articulated with friction, through the pin 18, to the link members 19 and 20, which are themselves freely rotatable with respect to the pin 26. Hence the brake shoe 3 and the link members 19 and 20 tend to rotate as an integral unit around the pin 26, under the action of the thrust transmitted by the link 109 to the pin 111.

The motion of the brake shoe 2 is somewhat more complex, for said shoe is freely articulated, through the pin 7, to the link members 5 and 6, which are themselves articulated with friction onto the pin 8 and the brake shoe 3. The pin 7 therefore moves with the link members 5 and 6, the brake shoe 3 and the link members 19 and 20, around the pin 26 as a center, while the brake shoe 2 may rotate around the pin 7. The movement of the brake shoe 2 is therefore the resultant of two rotations, one around the pin 7 and the other around the pin 26.

After a certain time, the brake shoes come into contact with the brake drum 1, and from that time on, the effect of the reaction of the drum is felt.

The brake drum is here supposed to revolve in the direction of the arrow f. It will be understood that the reaction of the drum tends to force the brake shoe 2 to revolve with said drum; this movement is opposed by the reaction of the link members 5 and 6, which is transmitted through the pin 8 to the brake shoe 3, which in turn transmits said reaction through the pin 18 and the link members 19 and 20, to the fixed pin 26. It is thus seen that the system comprising the brake shoes 2 and 3, the link members 5 and 6 on one end and 19 and 20 on the other end, form a self-applying brake which functions in a manner already well known in the art. For this direction of rotation of the brake drum, the brake shoe 4 has no self-applying effect.

Therefore if it is supposed that one of the brake shoes has come in contact with the drum before the others, it is seen that the displacement of the first shoe stops while that of the other shoes continues, until they in turn are in contact with the drum. Under these conditions, it is clear that the levers 96, 97 and 98 change their relative positions slightly. Said change in relative position will, at the end of the braking period, when the spring 107 begins to draw the brake shoes back into their "off" positions, allow the automatic centering of the brake shoes within the drum to be effected; in other words, through the medium of said slight change in the relative positions of said levers 96, 97 and 98 during the preceding braking period, when the brake is next applied, the brake shoes will all come simultaneously in contact with the drum.

When the hydraulic pressure is released, the spherical rubber membrane or diaphragm 48 is free to resume its initial position under the action of the spring 107; for said spring, in contracting, causes the assembly of parts comprising levers 96, 97 and 98, and the sleeve 94, to rotate anti-clockwise on the pin 93. The result is that the link members 104, 109 and 112 transmit respectively to the brake shoes 2, 3 and 4 motion which draws them away from the brake drum. The motion of brake shoes 2 and 4 towards each other evidently thrusts the screw 74, the piston member 67, the piston rod 62 and the piston 63, back into the body 43 of the hydraulic expanding mechanism, so that all these parts resume the positions shown in the drawings. In their "off" position, the brake shoes must be equally spaced away from the brake drum, and it will be understood that, in order to secure this result, it is necessary that the movement transmitted to the brake shoes 2, 3 and 4 by the contraction of the spring 107 should not be substantially modified by the relative displacements to which the levers 96, 97 and 98 may have been subjected during the previous braking period. In order to satisfy this condition, it is evidently sufficient that the link members 96 and 104, 97 and 109, and 98 and 112, respectively form between them angles differing only slightly from 90°; for example, that said angles be included between the limits of 80° and 100°. Under these conditions the displacements of the pins 106, 111, and 114, for a given angular displacement of levers 96, 97 and 98 under the action of the spring 107, are not substantially altered, even when the pins 105, 110 and 113 have been slightly displaced from their original positions.

Since the brake shoes 2, 3 and 4, when in the "off" position, must be equally spaced away from the surface of the drum 1, and since the clearance between them is a function of the angular displacement of the levers 96, 97 and 98 as an integral unit, it is clear that the lengths of said levers must have definite values, and likewise, that the position of the pivot pin 93 must be correctly determined, even if the positions of the pins 106, 111 and 114 have been arbitrarily chosen. The following procedure may be used to determine the correct values of these quantities.

On a drawing representing the outline of the brake, as in Fig. 11, the brake shoes 2, 3 and 4 are first laid out in their working positions, that is in contact with the drum 1, and then in the positions of rest which it is desired to ascribe to them between the braking periods, in which positions said brake shoes should be equally spaced away from the brake drum surface. It is known that the center lines of all the link members interconnecting said brake shoes must all pass through the poles of the corresponding brake shoes. Therefore, as shown in Fig. 11, the lines 104, 109 and 112, which indicate the geometric equivalents of the corresponding link members, may be laid out; hence the projection of the displacement of the pin 106 on line 104 may also be determined; and since the lever 96 is approximately perpendicular to the line 104, the length of said projection represents very closely the actual displacement of the pin 105. Likewise, the projection of the displacement of the pin 111 on the line 109 may also be laid out; and, since the lever 97 is substantially perpendicular to the line 109, the length of said projection may be taken as representing closely the displacement of the pin 110. Finally, the projection of the pin 114 on the line 112 may be laid out; and since the lever 98 is substantially perpendicular to the line 112, the length of said projection gives the measure of the displacement of the pin 113. It is evident that the radii of the levers 96, 97 and 98 must be proportional to the displacements so determined. Therefore the geometric lay out may be effected as follows:

On a perpendicular to the line 104 is laid out a length $a$—$b$ proportional to the displacement of the pin 105; and through point $b$ a parallel is drawn to the line 104. On a perpendicular to the line 112 is laid out a length $c$—$d$ proportional, with the same ratio of proportionality as in the previous case, to the displacement of the pin 113; and through the point $d$ is drawn a parallel to the line 112, which parallel intersects at $e$ that drawn through $b$ to the line 104. Through the point $e$, a perpendicular is now dropped onto line 109, and on said perpendicular is laid out a length $e$—$g$ proportional to the displacement of the pin 110; and, finally, through the point $g$ is drawn a parallel to the line 109.

In this manner, a triangle $k$—$l$—$m$ is obtained, which is similar to the triangle $k$—$n$—$p$, the ratio of proportionality being that of $$\frac{k-m}{k-p}$$

Evidently, the point within the triangle $k$—$n$—$p$ which should mark the geometric center of the pin 93 should be homologous to point $e$ in triangle $k$—$l$—$m$. The center of the pin 93 may therefore easily be located, and will give simultaneously the lengths of the levers 96, 97 and 98, which will be the lengths of perpendiculars dropped respectively from the point 93 onto the straight lines 104, 109 and 112.

In a brake designed as above indicated, it is clear that, in the "off" position, or position of rest, the brake shoes will be equally spaced away from the drum 1, and that during the braking periods, they will all come simultaneously in contact with the drum surface. The adjustment of the relative positions of the levers 96, 97 and 98 will be effected automatically at the first application of the brake, and will continue in the same automatic manner thereafter, whenever a new adjustment becomes necessary through unequal wear of the packing on the different brake shoes.

The disk 60 provided with a crown of ratchet teeth 64 co-acting with the pawl 65, the secondary piston 67 and the screw 74, constitute an automatic slack-adjusting mechanism which functions in the same manner as that disclosed in U. S. Patent 1,971,643, of August 28, 1934, to D. Sensaud de Laveau. Hence the description of said slack-adjusting mechanism would be superfluous, since it is already known in the art. The use of such a device in combination with the novel means hereinbefore described makes it possible to design a brake having automatic self-centering brake shoes and a constant slack, regardless of the wear of the brake packing.

When it is desired to apply the brake by mechanical instead of hydraulic means, the driver exerts, by means of the handle 137, a tractive effort on the flexible cable 85. It should be noted that, in the best known methods of transmitting mechanical forces through the medium of flexible cables, the reaction of the forces applied to the cable proper is taken up by the sheath 86 of said cable. Now said sheath is anchored to the supporting bracket 88, which is itself rigidly secured to the brake shoe 4. Hence, in the case of mechanical operation of the brake, as in that of hydraulic operation, the system of forces brought into play to expand the brake shoes is entirely internal to the brake and presents no point of application outside of said brake.

The tractive effort exerted on the cable 85 causes the lever 81 to revolve clockwise around the pin 82 as a center. Through the medium of the finger 80, said lever 81 exerts a thrust on the secondary piston 67 which causes the latter to slide axially outwards with respect to the body 43, which is secured to the brake shoe 4. The operation of the brake-expanding mechanism is therefore identical, from that point on, to that produced by the hydraulic means previously described; and it is interesting to note that the slack-adjusting mechanism is operative in both cases.

The fixed pins 116, 117 and 118, with their retaining washers 122, 123 and 124, serve only to limit the freedom of motion of the brake shoes substantially to the plane of the brake drum, and said pins play no active part in the operation of the brake. The orientation of the slots 119, 120 and 121 is determined graphically; moreover, as specified hereinbefore, said slots 119, 120 and 121 leave considerable clearance around the corresponding pins, and are intended to leave the brake shoes free to take up their correct positions.

The operation of the brake during reverse motion of the vehicle, that is when the brake drum 1 revolves in the opposite direction from that indicated by the arrow f, is similar to the operation during forward motion, with the exception that, in the second case, the brake shoe 4 is subjected to the automatic self-applying effect, whereas the brake shoes 2 and 3 are no longer subject to this effect.

As shown in the variant illustrated in Fig. 12, the spring 107 could be attached directly to the brake shoe 2, instead of acting on the lever 96. In this case, the pull of the spring 107 must be directed towards the pole E of the brake shoe 2, in order to satisfy the basic condition that all the forces acting on said brake shoe converge at the pole thereof.

It should be understood, of course, that the scope of this invention extends to the case where said forces acting on each brake shoe, instead of converging exactly at the respective poles thereof, intersect in pairs within a reasonable distance from said poles.

The embodiment of the invention indicated in Fig. 13 differs from that shown in Fig. 1 in that it comprises four brake shoes instead of three. The brake shoe 4, instead of supporting the body 43 of the hydraulic expanding device, is connected by means of the link members 144 to the fourth brake shoe 145, which now supports said body 43, together with the supporting bracket 88 to which is anchored the sheath of the cable of the mechanical operating device. The link members 144 are articulated with friction at 146 to the brake shoe 4, and are freely articulated at 147 to the brake shoe 145. A supplementary lever 148 is added to the levers 96, 97 and 98 on the sleeve 94, and said lever 148 is connected by a link member 149 to the brake shoe 145. Said link member 149 is articulated at 150 onto the lever 148, and at 151 onto the brake shoe 145. For said brake shoe as for the others, the direction of the forces transmitted by the link member 149 passes substantially through the pole of said brake shoe. The operation is evidently identical to that described in connection with the embodiment illustrated in Fig. 1, with the exception that, in Fig. 13, the brake is symmetrical, and operates in the same manner on forward and reverse motion.

In the embodiment illustrated in Fig. 14, the same elements are found as in that of Fig. 13; that is, the brake comprises four symmetrical brake shoes; but the levers 96, 97, 98 and 148, instead of having a common axis of rotation on the pin 93, are mounted on two separate pins symmetrically disposed. Thus it is seen that the levers 96 and 97 are mounted on the sleeve 94 previously described, which sleeve is itself mounted on the pin 93. But the levers 98 and 148 are mounted on another sleeve 152, similar to sleeve 94, which sleeve 152 is mounted on a second pin 153, similar to the pin 93. The return spring 154 of the brake shoes is not connected between the lever 96 and a fixed support 115, but directly between said lever 96 and the lever 148. This arrangement functions in exactly the same manner as that shown in Fig. 13, and therefore constitutes a simple variant thereof, which, under certain circumstances, may facilitate the construction or the assembly of the brake parts, owing to the fact that the levers 96, 97, 98 and 148 are no longer mounted all on the same pin.

However, the above design, as described, might, under certain conditions, prove unsatisfactory, in that the assembly of brake parts might tend to rotate as a whole around the pin 26 as a center, unless special precautions were taken to prevent said motion; in which case, the accurate centering of the brake shoes would no longer be insured.

In order to correct this defect, the lever 148 may be extended, as shown in Fig. 14, to form an extension arm 155 beyond the pin 153, which extension arm 155 is connected by means of a link member 156 to the lever 96, said connection being effected by means of the articulations 157 and 158. In this manner, the displacements of levers 148 and 96 are co-ordinated.

The various embodiments of my invention hereinbefore described and illustrated in the accompanying drawings constitute certain preferred forms of said invention; but I wish it to be understood that I do not desire to be limited to the actual structural details and assemblies shown and described, for obvious modifications thereto will occur to one skilled in the art.

What I claim is:

1. In a braking device, a brake drum, a plurality of brake shoes adapted to contact with said brake drum, pressure applying means for applying said brake shoes against said brake drum, elastic means adapted to oppose said pressure applying means and to return said brake shoes to their position of rest when said pressure applying means cease to function, a fixed pivot pin, a plurality of levers freely and rotatably mounted on said pivot pin, means for creating frictional contact between said levers, and linkage means interconnecting said levers with said brake shoes.

2. In a braking device, a brake drum, a plurality of brake shoes adapted to contact with said brake drum, linkage means interconnecting adjacent brake shoes for forming a chain terminating in two end brake shoes, a first fixed pivot pin, linkage means connecting one end brake shoe to said first pivot pin, pressure applying means for thrusting the other end brake shoe towards said brake drum, elastic means adapted to oppose said pressure applying means, a second fixed pivot pin, a plurality of levers freely and rotatably mounted on said second fixed pivot pin, means for creating frictional contact between said levers, and linkage means connecting said levers to said brake shoes.

3. In a braking device, a brake drum, a plurality of brake shoes adapted to contact with said brake drum, linkage means interconnecting adjacent brake shoes for forming a chain terminating in two end brake shoes, a first fixed pivot pin, linkage means connecting one end brake shoe to said fixed pivot pin, pressure applying means for thrusting the other end brake shoe towards said brake drum in a given fixed direction, means adapted to oppose said pressure applying means and to exert a pull on said second end brake shoe, a second fixed pivot pin, a plurality of levers freely and rotatably mounted on said second fixed pivot pin, means for creating frictional contact between said levers and linkage means interconnecting said levers with said brake shoes.

4. In a braking device, a brake drum, two brake shoes adapted to contact with said brake drum, linkage means interconnecting said brake shoes, a freely rotatable articulation connecting said linkage means to one of said brake shoes, an articulation producing frictional resistance connecting said linkage means and the second brake shoe, a fixed support, a second linkage means, an articulation producing frictional resistance connecting said second linkage means to said second brake shoe, a free articulation connecting said second linkage means and said fixed support, a fixed pivot pin, a plurality of levers freely and rotatably mounted on said fixed pivot pin, means for maintaining frictional contact between said levers, two linkage means interconnecting said levers with said brake shoes, means for thrusting one of said brake shoes towards said brake drum, and elastic means adapted to oppose said thrusting means.

5. In a braking device, a brake drum, a plurality of brake shoes adapted to contact with said brake drum, a plurality of linkage means interconnecting adjacent brake shoes, a first fixed pivot pin, linkage means interconnecting one end brake shoe with said first fixed pivot pin, pressure applying means for thrusting the other end brake shoe towards said brake drum, a second fixed pivot pin, a plurality of levers freely and rotatably mounted on said second fixed pivot pin, means for maintaining frictional resistance between said levers, linkage means interconnecting said levers with said brake shoes, a spring member adapted to oppose said pressure applying means, said spring member being attached to the lever linked with said end brake shoe subjected to the thrust of said pressure applying means.

6. In a braking device, a brake drum, two brake shoes adapted to contact with said brake drum, linkage means interconnecting said brake shoes, a free articulation connecting said linkage means with one of said brake shoes, an articulation with friction connecting said linkage means with said second brake shoe, a fixed support, a second linkage means, an articulation with friction connecting said second linkage means with said second brake shoe, a free articulation connecting said second linkage means to said fixed support, a fixed pivot pin, a plurality of levers freely and rotatably mounted on said fixed pivot pin, means for maintaining frictional resistance between said levers, two linkage means interconnecting said levers with said brake shoes, means for thrusting one of said brake shoes towards said brake drum, and a spring attached to the lever linked with said first brake shoe.

7. In a braking device, a brake drum, a first fixed pivot pin, a plurality of brake shoes arranged in sequence and adapted to contact with said brake drum, linkage means interconnecting adjacent brake shoes and connecting said brake shoes with said first fixed pivot pin, pressure applying means for thrusting the end brake shoe towards said brake drum, another brake shoe arranged between said first fixed pivot pin and said pressure applying means and adapted to receive a thrust from said pressure applying means, a second fixed pivot pin, a plurality of levers freely and rotatably mounted on said second fixed pivot pin, means for maintaining frictional resistance between said levers, linkage means interconnecting said levers with said brake shoes and elastic means adapted to oppose said pressure applying means.

8. In a braking device, a brake drum, two brake shoes adapted to contact with said brake drum, linkage means interconnecting the first of said brake shoes with the second, a first fixed pivot pin, linkage means interconnecting said second brake shoe with said first fixed pivot pin, a third brake shoe, means for connecting said third brake shoe with said first fixed pivot pin, pressure applying means mounted on said third brake shoe and adapted to exert a thrust on said first brake shoe, a second fixed pivot pin, a plurality of levers freely and rotatably mounted on said second fixed pivot pin, means for maintaining frictional resistance between said levers, linkage means interconnecting said levers with said brake shoes, and elastic means adapted to oppose said pressure applying means.

9. In a braking device, a brake drum, two brake shoes adapted to contact with said brake drum, linkage means interconnecting the first of said brake shoes with the second, a first fixed pivot pin, linkage means interconnecting said second brake shoe with said first fixed pivot pin, a third brake shoe, means for interconnecting said third brake shoe with said first fixed pivot pin, pressure applying means supported by said third brake shoe and adapted to exert a thrust on said first brake shoe, a second fixed pivot pin, a plurality of levers freely and rotatably mounted on said second pivot pin, means for maintaining frictional resistance between said levers, linkage means interconnecting said levers with said brake shoes, and a spring attached to the lever linked with said first brake shoe.

10. In a braking device, a brake drum, two brake shoes adapted to contact with said brake drum, linkage means interconnecting said brake shoes, a free articulation connecting said linkage means to the first of said brake shoes, an articulation with friction connecting said linkage means to the second of said brake shoes, a fixed support, a second linkage means, an articulation with friction connecting said second linkage means to said second brake shoe, a free articulation connecting said second linkage means to said fixed support, a third brake shoe, a third linkage means, a free articulation connecting said third linkage means to said fixed support, an articulation with friction connecting said third linkage means to said third brake shoe, pressure applying means supported by said third brake shoe and adapted to exert a thrust on said first brake shoe, a fixed pivot pin, a plurality of levers freely and rotatably mounted on said fixed pivot pin, means for maintaining frictional resistance between said levers, linkage means interconnecting said levers with said brake shoes, and elastic means adapted to oppose said pressure applying means.

11. In a braking device, a brake drum, two brake shoes adapted to contact with said brake drum, linkage means interconnecting said brake shoes, a free articulation connecting said linkage means to the first of said brake shoes, an articulation with friction connecting said linkage means to the second of said brake shoes, a fixed support, a second linkage means, an articulation with friction connecting said second linkage means to said second brake shoe, a free articulation connecting said second linkage means to said fixed support, a third brake shoe, a third linkage means, a free articulation connecting said third linkage means to said fixed support, an articulation with friction connecting said third linkage means to said third brake shoe, pressure applying means supported by said third brake shoe and adapted to exert a thrust upon said first brake shoe, a fixed pivot pin, a plurality of levers freely and rotatably mounted on said fixed pivot pin, means for maintaining frictional resistance between said levers, linkage means interconnecting said levers with said brake shoes, and a spring attached to the lever linked with the first brake shoe.

12. In a braking device, a brake drum, a plurality of brake shoes adapted to contact with said brake drum, expanding means supported by one of said brake shoes and co-acting with an adjacent brake shoe, said expanding means comprising a lever pivoted on said supporting brake shoe, a spring inserted between said brake shoe and said lever, a flexible traction cable attached to said lever, and a flexible guiding sheath for said cable, said guiding sheath being anchored to said supporting brake shoe, elastic means adapted to oppose said expanding means and to draw said brake shoes back to their positions of rest, a fixed pivot pin, a plurality of levers freely and rotatably mounted on said fixed pivot pin, means for maintaining frictional resistance between said levers, and linkage means interconnecting said levers and said brake shoes.

13. In a braking device, a brake drum, a plurality of brake shoes adapted to contact with said brake drum, expanding means supported by one of said brake shoes and co-acting with an adjacent brake shoe, said expanding means comprising a lever pivoted on said supporting brake shoe, a spring inserted between said supporting brake shoe and said lever, a flexible traction cable attached to said lever, a flexible guiding sheath for said cable, said sheath being anchored to said supporting brake shoe, elastic means adapted to oppose said expanding means and to draw said brake shoes back into a position of rest, linkage means interconnecting adjacent brake shoes, a first fixed pivot pin, linkage means interconnecting one of the end brake shoes with said first fixed pivot pin, a second fixed pivot pin, a plurality of levers freely and rotatably mounted on said second fixed pivot pin, means for maintaining frictional resistance between said levers, and linkage means interconnecting said levers with said brake shoes.

14. In a braking device, a brake drum, two brake shoes adapted to contact with said brake drum, linkage means interconnecting said first and second brake shoes, a first fixed pivot pin, linkage means interconnecting said second brake shoe with said fixed pivot pin, a third brake shoe, means for connecting said third brake shoe to said fixed pivot pin, expanding means supported by one of said brake shoes and co-acting with an adjacent brake shoe, said expanding means comprising a lever pivoted on said supporting brake shoe, a spring inserted between said supporting brake shoe and said lever, a flexible traction cable attached to said lever, a flexible guiding sheath for said cable, said sheath being anchored to said supporting brake shoe, a second fixed pivot pin, a plurality of levers freely and rotatably mounted on said second fixed pivot pin, means for maintaining frictional resistance between said levers, linkage means interconnecting said levers with said brake shoes, and elastic means adapted to oppose said expanding means.

15. In a braking device, a brake drum, two brake shoes adapted to contact with said brake drum, linkage means interconnecting said brake shoes, a free articulation connecting said linkage means to the first of said brake shoes, an articulation with friction connecting said linkage means to said second brake shoe, a fixed support, a second linkage means, an articulation with friction connecting said second linkage means to said second brake shoe, a free articulation connecting said second linkage means to said fixed support, a third brake shoe, a third linkage means, a free articulation connecting said third linkage means to said fixed support, and articulation with friction connecting said third linkage means to said third brake shoe, expanding means supported by one brake shoe and co-acting with an adjacent brake shoe, said expanding means comprising a lever pivoted on the supporting brake shoe, a spring inserted between said supporting brake shoe and said lever, a flexible traction cable attached to said lever, a flexible guiding sheath for said cable, said sheath being anchored to said supporting brake shoe, a fixed pivot pin, a plurality of levers freely and rotatably mounted on said fixed pivot pin, means for maintaining frictional resistance between said levers, linkage means interconnecting said levers with said brake shoes, and elastic means adapted to oppose said expanding means.

LOUIS CHARLES BRISSON.